Feb. 20, 1940. S. E. PIHL 2,191,412
SNAP FASTENER STUD
Filed Aug. 2, 1935
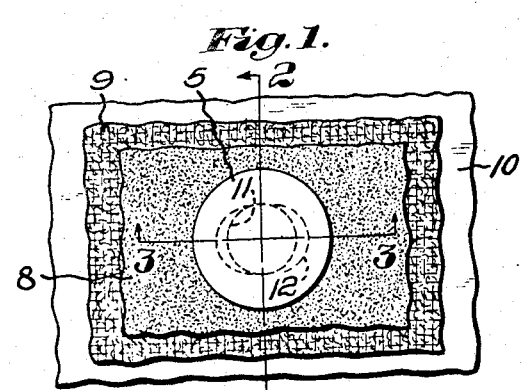
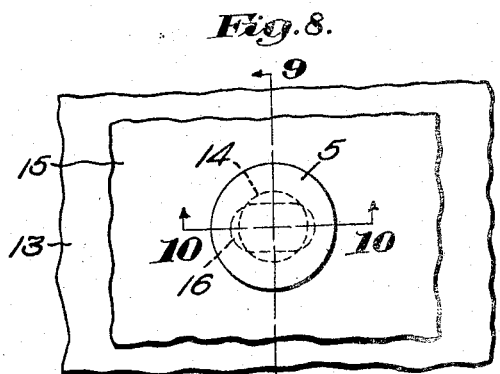
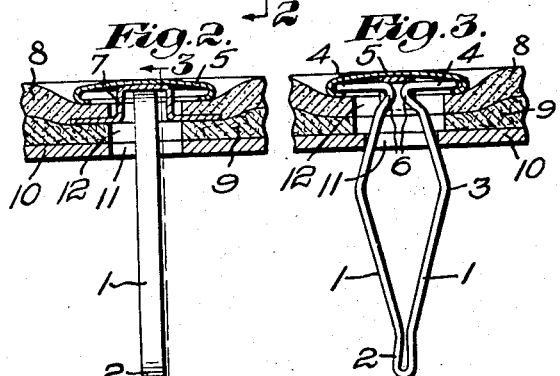
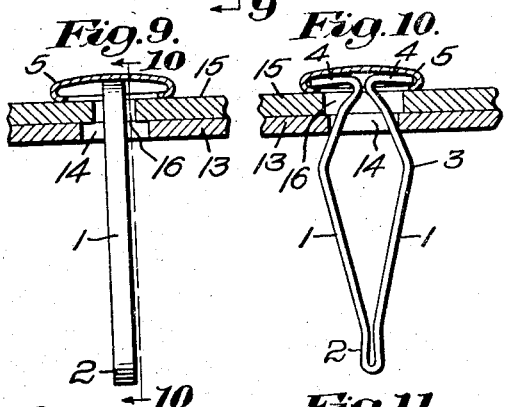
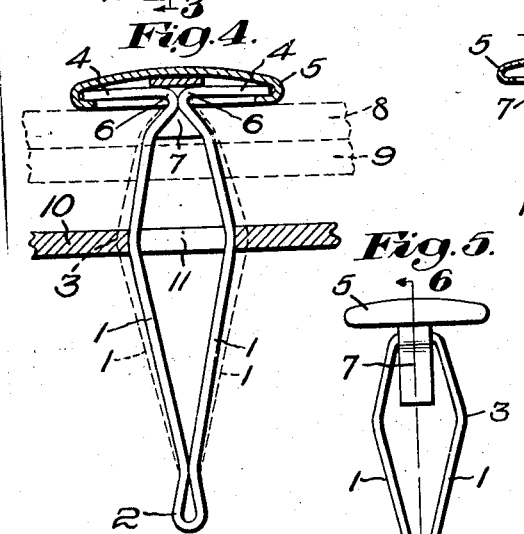
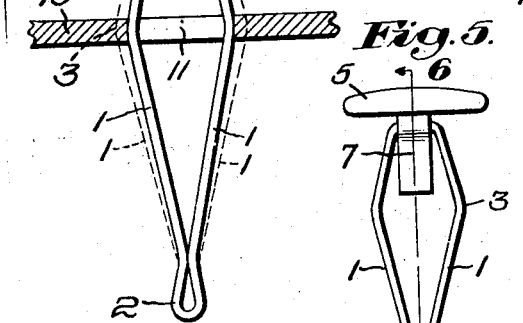
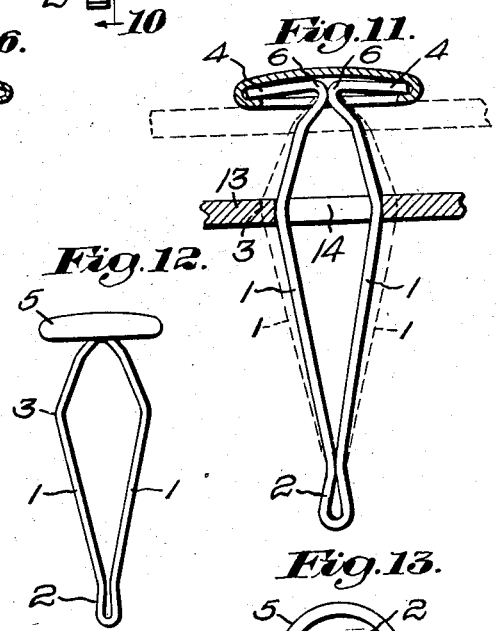
Inventor:
Sophus E. Pihl,
by Walter S. Jones
Atty.

Patented Feb. 20, 1940

2,191,412

UNITED STATES PATENT OFFICE 2,191,412

SNAP FASTENER STUD

Sophus E. Pihl, Dorchester, Mass., assignor to United-Carr Fastener Corporation, Cambridge, Mass., a corporation of Massachusetts Application August 2, 1935, Serial No. 34,360

2 Claims. (Cl. 24—73)

My invention aims to provide improvements in snap fastener studs.

In the drawing which illustrates preferred embodiments of my invention:

Figure 1 is a plan view of one preferred embodiment of my invention in connection with securing a carpet to a floor;

Fig. 2 is a section taken on the line 2—2 of Figure 1;

Fig. 3 is a section taken on the line 3—3 of Fig. 2;

Fig. 4 is an enlarged sectional view of the installation shown in Figs. 1, 2 and 3 showing the action of the stud legs as they pass through the stud aperture;

Fig. 5 is a side elevation of the stud unit per se;

Fig. 6 is a section taken on the line 6—6 of Fig. 5;

Fig. 7 is a bottom plan view of the stud per se;

Fig. 8 is a plan view of another preferred form of fastener-secured installation showing my novel stud as an upholstery panel stud;

Fig. 9 is a section taken on the line 9—9 of Fig. 8;

Fig. 10 is a section taken on the line 10—10 of Fig. 9;

Fig. 11 is a view of the installation shown in Fig. 8 showing the action of the fastener stud legs;

Fig. 12 is a side elevation of the stud shown in Fig. 11; and

Fig. 13 is a bottom plan view of the stud shown in Fig. 12.

Referring first to the stud units shown, it will be noted that they are the same for both installations, except in the carpet stud unit I have added an attaching element for securing the stud to the carpet.

My improved stud member is made from a narrow strip of metal, preferably sheet metal in ribbon form, and may be tempered before or after forming. The stud has a shank formed by two opposed legs 1—1 joined together by a narrow loop portion 2 at their outer ends. The legs diverge from the loop to form a tapered construction to force the legs toward each other when forced through a hole or stud-receiving aperture. From their widest portion 3 the legs then converge to provide holding portions when engaged in a stud-receiving member. The stud also has outwardly turned portions 4—4 extending from the legs 1—1 to form a base, as shown in Figs. 4 and 11, to which is secured a cap 5. It will also be noted that I have bent the legs 1—1 toward each other, where they join the base portions 4—4, to abut each other normally, or upon slight movement, to form fastener action-controlling portions 6—6. These portions will be more fully hereinafter described.

Referring now to Figs. 1 through 7, inclusive, I have shown a carpet fastener and installation thereof. The fastener stud is the same as that referred to above except that it has the added attaching part 7 in the form of a bendable U-shaped clip assembled between the cap and the stud member. The free ends of the attaching part extend between the legs 1—1 of the stud (Fig. 6) so that they will not catch on the carpet when the stud is being assembled therewith.

The carpet installation shown includes a carpet 8, a padding 9 under the carpet, and a floor 10, herein shown as of metal, as used in motor vehicle bodies. This floor 10 is provided with a suitable number of stud-receiving apertures 11. The stud is assembled with the carpet by forcing the shank through an aperture 12 in the carpet 8 and padding 9 and then the ends of the attaching part 7 are bent outwardly (Fig. 2) thus holding the stud securely in place.

The action of the stud may be described as follows and it should be understood that the action is controlled by the shape and arrangement of the parts which may be varied to secure the desired holding power and adjustment to variations in thickness of parts to be secured together. Thus as the stud and carpet are moved toward the floor the small looped end 2 of the stud will enter the aperture. This small loop 2 acts as an easy entering portion to find the aperture 11 and guide the shank of the stud while permitting considerable misalignment between the stud and the aperture. Then as the stud shank is forced through the aperture the tapered legs 1—1 engage the wall surrounding the aperture and as pressure is continued the legs are moved toward each other. Here again the loop 2 serves a useful purpose inasmuch as it aids in permitting flattening of the bowed legs and adds flexibility to the fastener that would not be present without the loop. Thus the sides of the loop 2 move toward each other (Figs. 4 and 11) and then the bowed legs flatten as they pass by their greatest point of separation. During this action the portions 6—6 abut and provide a stiffening action adjacent to the base of the fastener so that when the stud is snapped into final position the legs will grip the wall surrounding the aperture 11 with sufficient force to hold the parts tightly together and under a tension.

Referring now to Figs. 8 through 13 I have shown an upholstery installation and a preferred form of my novel capped fastener for such installation. The installation includes a support or frame 13 of thin structure having a stud-receiving aperture 14 and a piece of cardboard 15 which may be a covering panel of any suitable shape and construction. The panel 15 also has an aperture 16 for alignment with the aperture 14, as shown in Fig. 10. The stud member shown is the same as that already described except that the attaching member is unnecessary and therefore has been eliminated.

My improved fastener members are simple in construction, durable, neat in appearance, may have a very small inconspicuous cap, are adapted for use in various sizes of holes and various thicknesses of material without changing the fastener construction and have excellent holding power. They adapt themselves to misaligned apertures and small holes in fabrics without catching on the material due particularly to the small smooth looped end.

While I have illustrated and described preferred embodiments of my invention, I do not wish to be limited thereto, because the scope of my invention is best defined by the following claims.

I claim:

1. A snap fastener stud having base means, a yieldable shank formed by opposed yieldable legs joined together at that end of the shank spaced from said base means, a cap secured to said base means, fastener action-controlling means adjacent to said base means to restrict the movement of said legs adjacent to said base means, and attaching means assembled as a part of the fastener to pass through a stud support and engage the opposite side thereby to cooperate with said cap to secure the stud to a support.

2. A snap fastener stud having base means, a yieldable shank formed by opposed yieldable legs joined together at that end of the shank spaced from said base means, a cap secured to said base means, fastener action-controlling means adjacent to said base means to restrict the movement of said legs adjacent to said base means, and U-shaped attaching means assembled as a part of the fastener to pass through a stud support and engage the opposite side thereby to cooperate with said cap to secure the stud to a support.

SOPHUS E. PIHL.